(12) United States Patent
Heller et al.

(10) Patent No.: US 7,052,332 B2
(45) Date of Patent: May 30, 2006

(54) CONNECTING POLE FOR AN ACCUMULATOR

(75) Inventors: Karl-Heinz Heller, Bisingen (DE); Gunter Seeh, Neuhausen ob Eck (DE); Friedhelm Sieber, Albstadt (DE)

(73) Assignee: Dionys Hofmann GmbH, (DE)

( * ) Notice: Subject to any disclaimer, the term of this patent is extended or adjusted under 35 U.S.C. 154(b) by 0 days.

(21) Appl. No.: 10/468,878

(22) PCT Filed: Feb. 21, 2002

(86) PCT No.: PCT/EP02/01848

§ 371 (c)(1),
(2), (4) Date: Feb. 17, 2004

(87) PCT Pub. No.: WO02/075828

PCT Pub. Date: Sep. 26, 2002

(65) Prior Publication Data

US 2004/0132353 A1 Jul. 8, 2004

(30) Foreign Application Priority Data

Feb. 22, 2001 (DE) .............................. 101 08 649

(51) Int. Cl.
*H01R 4/38* (2006.01)
(52) U.S. Cl. .................. 439/766; 439/736; 439/874
(58) Field of Classification Search .............. 439/766, 439/736, 874, 754, 767
See application file for complete search history.

(56) References Cited

U.S. PATENT DOCUMENTS

| | | | | | |
|---|---|---|---|---|---|
| 2,944,325 | A | * | 7/1960 | Clark | 29/876 |
| 3,413,593 | A | * | 11/1968 | Schaefer | 439/522 |
| 3,936,132 | A | * | 2/1976 | Hutter | 439/551 |
| 4,118,097 | A | * | 10/1978 | Budnick | 439/387 |
| 4,354,725 | A | * | 10/1982 | Herbaugh et al. | 439/736 |
| 4,480,151 | A | * | 10/1984 | Dozier | 174/153 R |
| 4,643,511 | A | * | 2/1987 | Gawlik et al. | 439/755 |
| 4,778,949 | A | * | 10/1988 | Esterle et al. | 174/151 |
| 6,450,842 | B1 | * | 9/2002 | Matsuda et al. | 439/801 |

FOREIGN PATENT DOCUMENTS

DE G 89 12 155.4 1/1990
DE 42 41 393 C2 5/1999

* cited by examiner

*Primary Examiner*—Hien Vu
(74) *Attorney, Agent, or Firm*—Ostrolenk, Faber, Gerb & Soffen, LLP

(57) ABSTRACT

A connecting pole for an accumulator having a pole sleeve (1) which can be inserted in a sealed manner into a plastic housing part (8) of an accumulator housing and makes electrical contact with a cell connector (2), and having connecting elements for electrical connection of the pole sleeve (1) to an electrical conductor (3), with the electrical connection being secured by means of a mechanical lock against becoming loose. For this purpose, a contact-making element (5; 9) is provided on the pole sleeve (1) and is firmly connected to it, and on which a locking element (6; 10) can be placed with an interlock and/or a force fit in order to mechanically lock the electrical connection between the pole sleeve (1) and the electrical conductor (3).

9 Claims, 5 Drawing Sheets

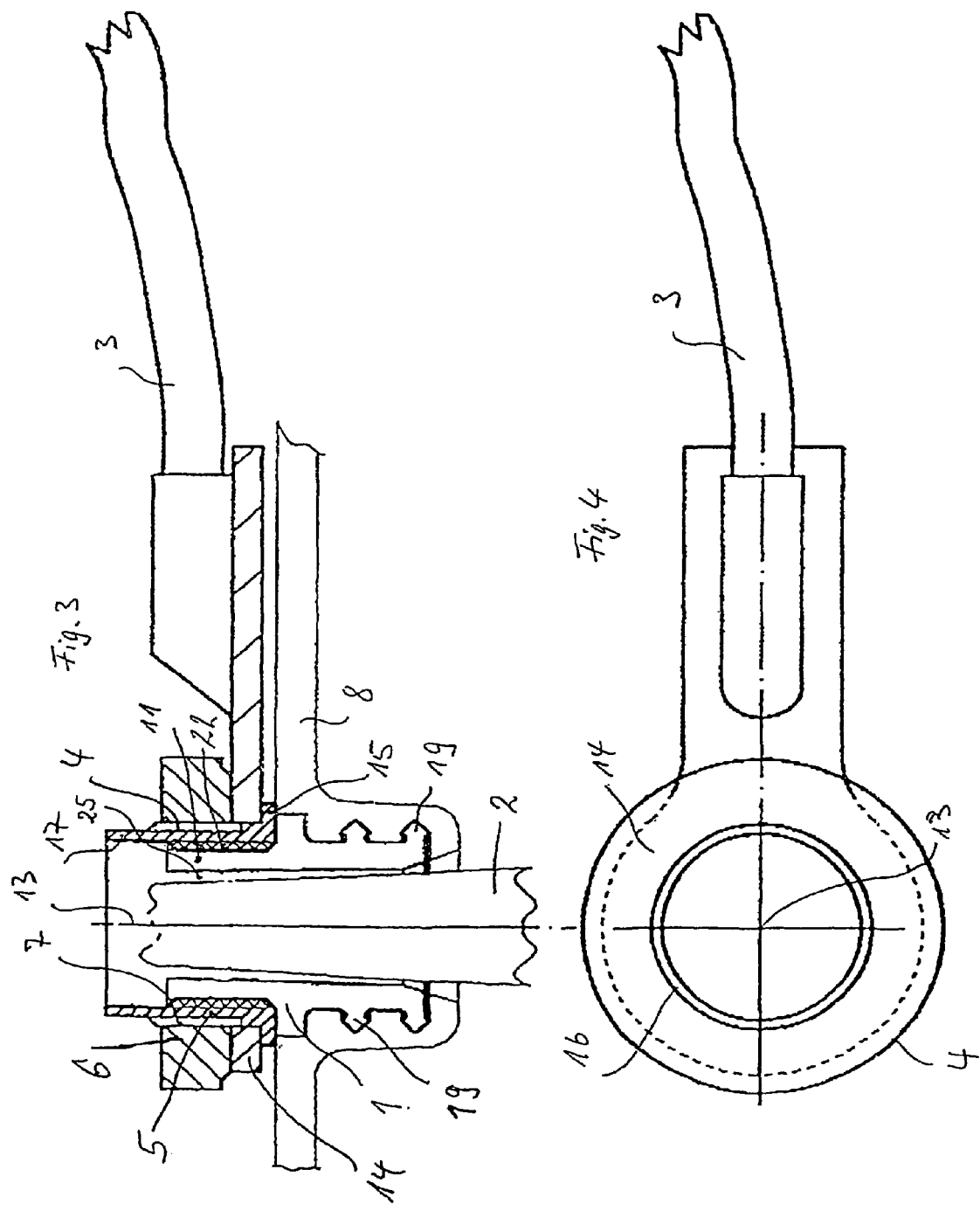

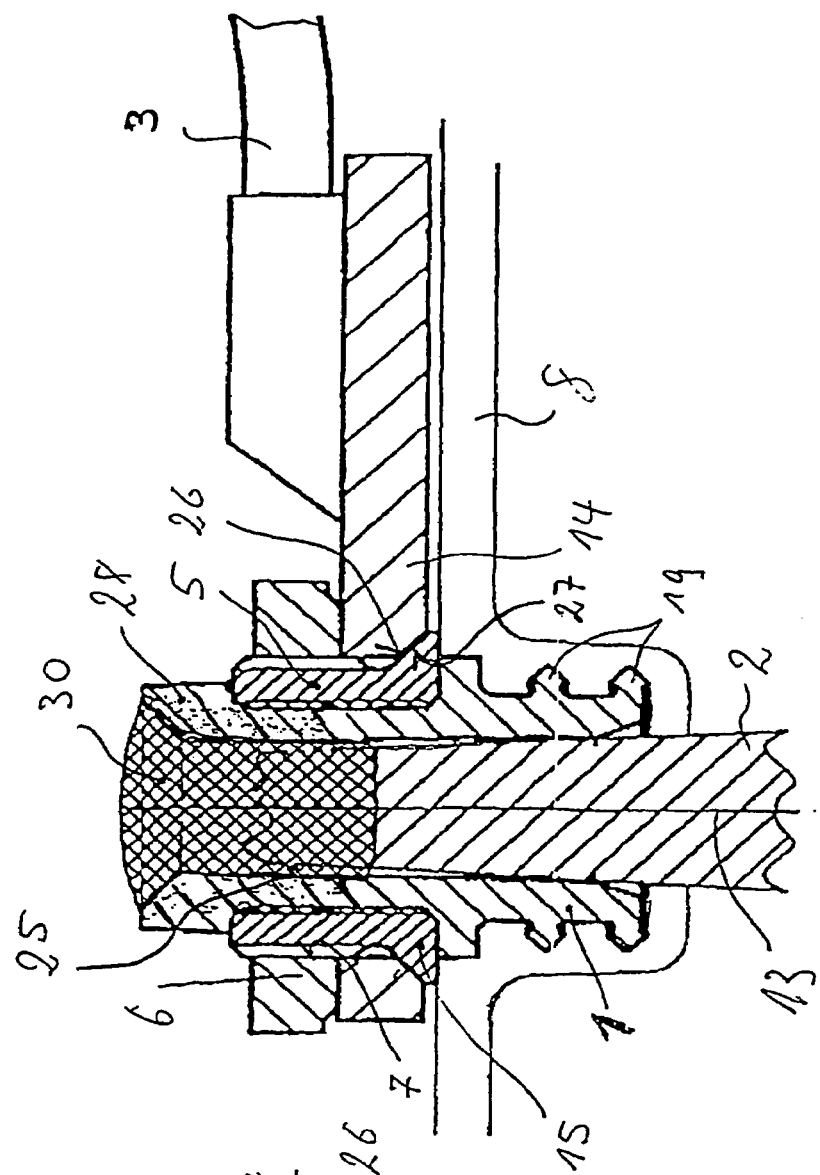

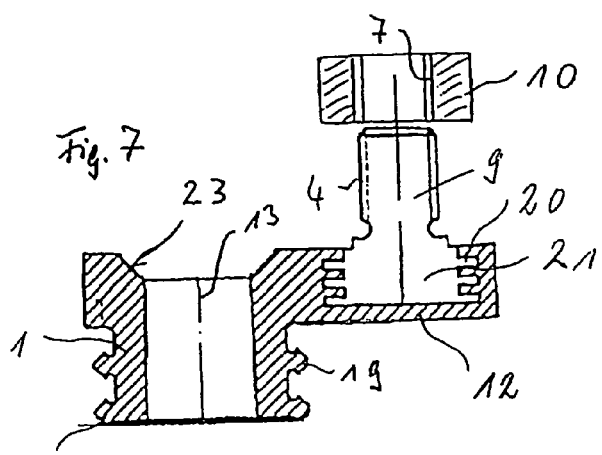
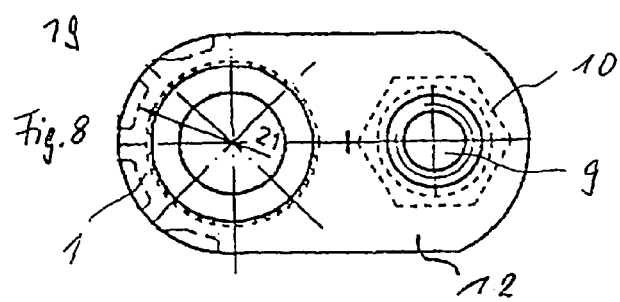
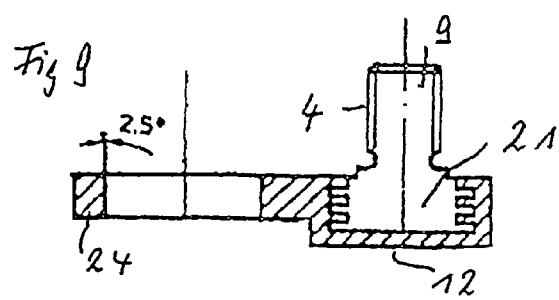
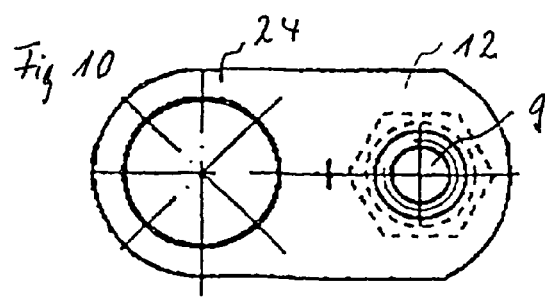
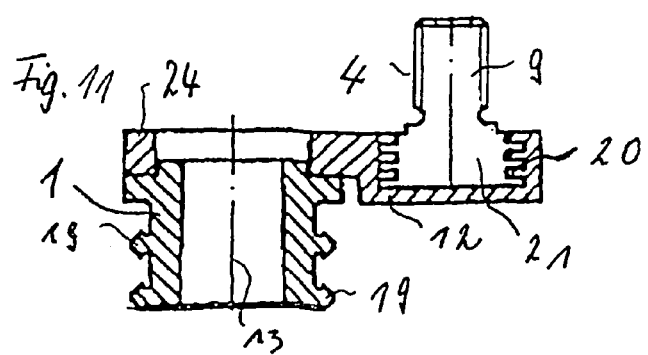

CONNECTING POLE FOR AN ACCUMULATOR

FIELD OF THE INVENTION

The invention relates to a connecting pole for an accumulator according to the precharacterizing clause of patent claim 1.

BACKGROUND OF THE INVENTION

In a connecting pole of this type which is known from DE 89 12 155 U1 a brass insert with an internal thread is inserted into the pole sleeve, which is integrally formed on a cell connector. An electrical conductor has at its end a connecting eye through whose opening a screw is passed and is screwed into the internal thread in the brass insert in the pole sleeve. O-rings are provided on both sides of the connecting eye, for sealing. With the known connecting pole, the pole sleeve must be integrally formed on the cell connector or end pole. Furthermore, additional O-rings are required for sealing.

Furthermore, DE 42 41 393 C2 discloses a connecting pole for an accumulator, in which the pole sleeve has circumferential grooves on its base part, and these grooves have a zigzag profile. This results in a good sealing effect thus effectively preventing electrolyte and/or gas from emerging from the interior of the accumulator.

BRIEF DESCRIPTION OF THE DRAWINGS

The object of the invention is to provide a connecting pole of the type mentioned initially in which the special design of the pole sleeve provides the necessary sealing and in which an electrical connection which is secure against becoming loose is achieved in a simple manner between the electrical conductor and the pole sleeve, even when large forces are applied.

According to the invention, this object is achieved by the characterizing features of patent claim 1 for the connecting pole as mentioned initially.

Figure 1:
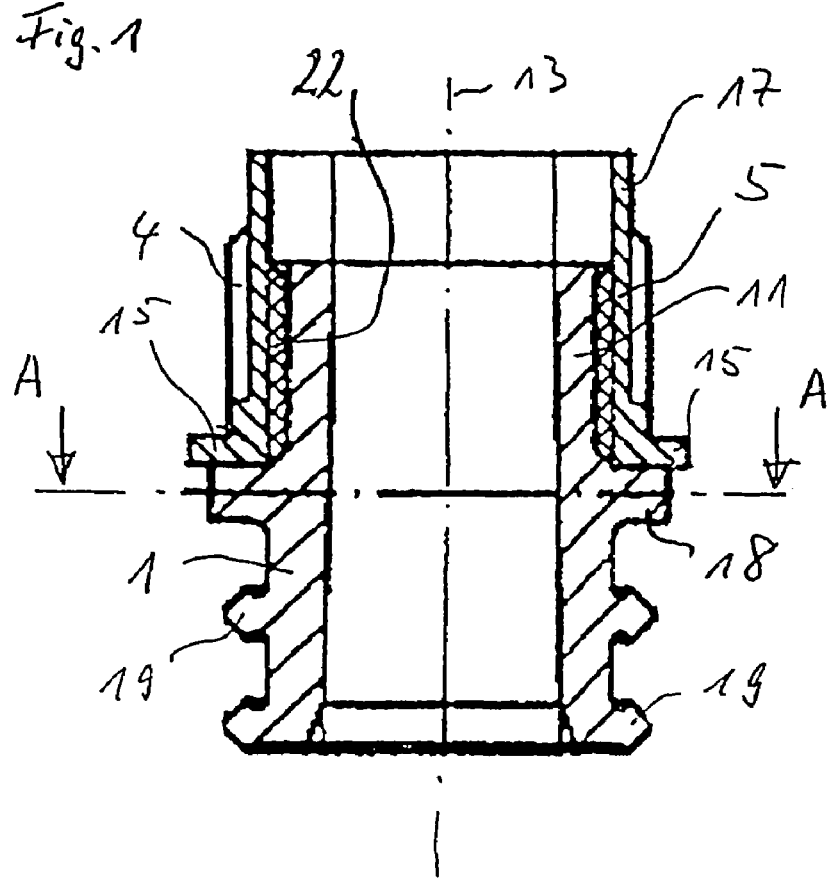

In the invention, a contact-making element which is firmly connected to the pole sleeve is provided on the pole sleeve and is composed of mechanically harder material than the pole sleeve. The mechanically hard material of the contact-making element, which is designed to be electrically conductive, and having a conventional second contact-making element which is, for example, in the form of a contact-making sleeve allows electrical contact to be made in an interlocking and/or force-fitting manner, thus preventing the electrical connection from becoming loose. For mechanical locking, the second contact-making element (which is in the form of a contact-making sleeve) can be firmly connected to the outer surface of the hard contact-making element in a conventional manner with a clamping fit, for example by tightening a clamping screw firmly. The outer surface of the first contact-making element, which is connected to the pole sleeve, is preferably equipped with raised areas and depressions. These raised areas and depressions can preferably be grooves which run all the way round in the form of a ring, or a screw thread. For mechanical locking of the electrical connection, a contact-making eye which is provided on the electrical conductor and forms the second contact-making element can be attached to the outside of the pole sleeve or to an axial pole sleeve extension by means of a locking element which has an internal thread and is screwed onto the first locking element. The first contact-making element, which is in the form of a contact-making sleeve, can project in the axial direction with an overhang over the upper edge of the pole sleeve or pole sleeve extension. When the pole sleeve, which is preferably composed of lead, is being connected to the cell connector or to the end pole, this prevents lead from flowing or dripping onto the plastic housing due to the introduction of heat during the welding or soldering process.

The first contact-making element, which is firmly connected to the pole sleeve, is preferably composed of a material with a higher melting point than that of the pole sleeve, so that the contact-making element withstands the introduction of heat that is used for connecting the pole sleeve to the cell connector, without melting.

The first contact-making element can be electrochemically tinned so that a firm connection, which is formed by techniques such as bonding, soldering or welding, is formed by a cast-on connecting layer on the touching surfaces between the contact-making element and the pole sleeve, when heated.

The first contact-making element can also be in the form of a contact-making bolt which is attached to the pole sleeve at the side, for example on an angled mount. The mount may be integrally connected to the pole sleeve. However, it is also possible to attach the mount to the pole sleeve, for example by welding or soldering. The contact-making bolt has anchoring projections which run all the way round on a bolt foot and by means of which it is anchored in the mount, which is preferably composed of lead in the same way as the pole sleeve. The contact-making bolt can be inserted into the eye opening in the contact-making eye of the electrical conductor, and the contact-making eye is secured in the same way as in the exemplary embodiment described above with the aid of the locking element, which may be in the form of a nut, in particular a knurled nut. The contact-making eye may rest on a circumferential edge which is integrally formed on the contact-making sleeve or on the contact-making bolt. Both the contact-making bolt and the contact-making sleeve are composed of an electrically conductive material. However, it is also possible for the contact-making eye of the electrical conductor to rest on the pole sleeve or on the mount, and to be pushed on by the locking element while it is being screwed on.

The connecting pole is preferably used for accumulators which are used as starter batteries in motor vehicles. Even when large forces are applied, such as those which occur in the event of a crash, the electrical conductor remains firmly connected to the pole sleeve. There is no risk of the electrical conductor becoming detached, and hence no risk of any sparks being formed.

EXAMPLES

Figure 2:
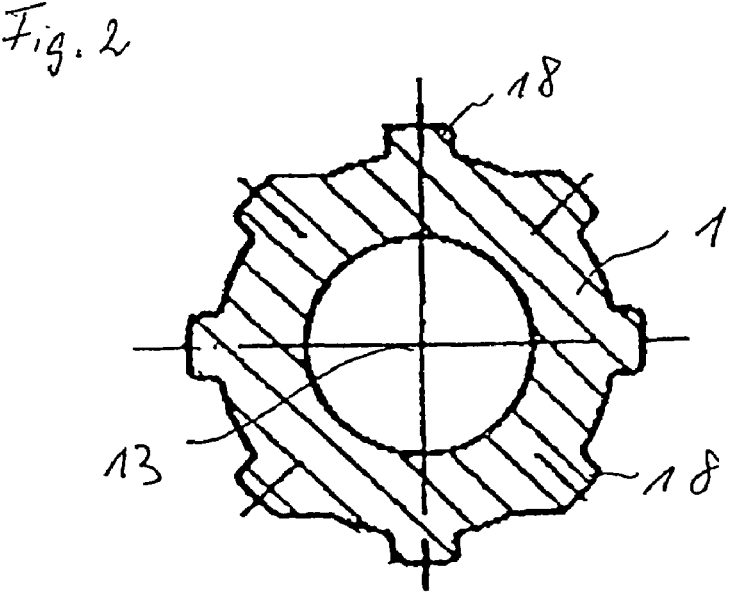
Figure 12:
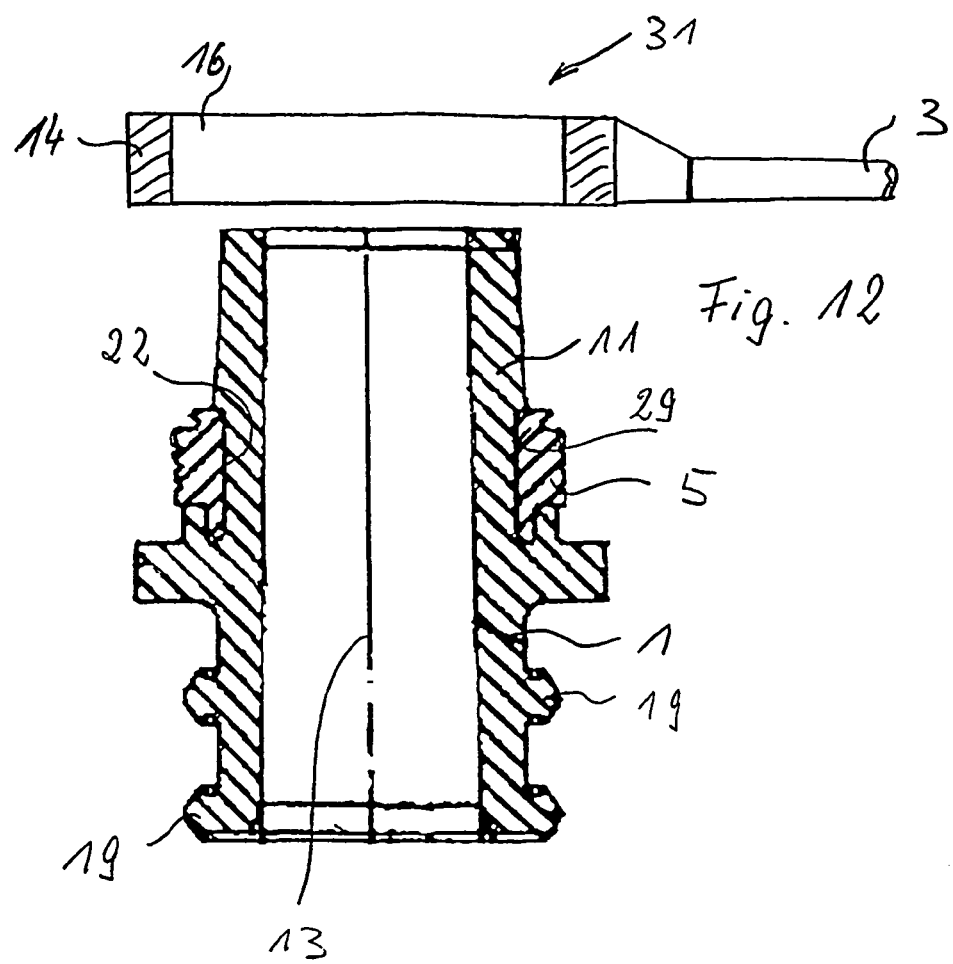
Figure 13:
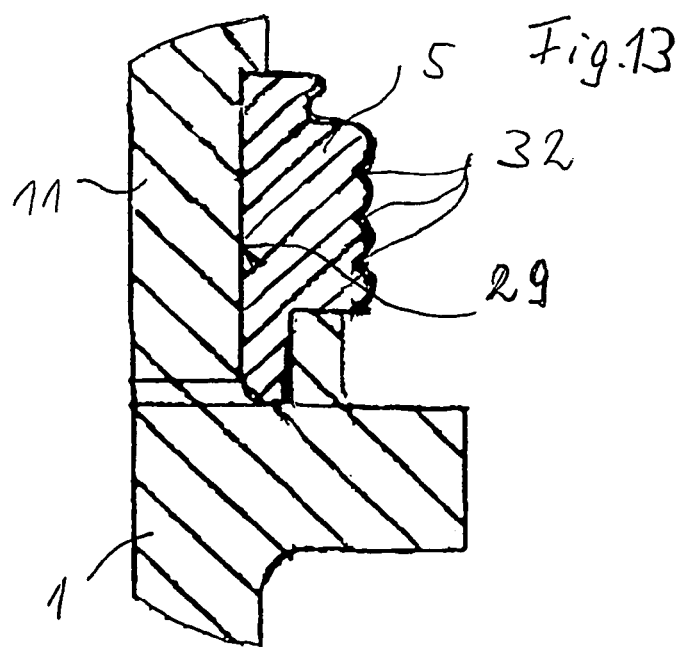

The invention will be explained in more detail using exemplaiy embodiments and with reference to the figures, in which:

FIG. 1 shows an illustration in the form of a section of a first exemplary embodiment;

FIG. 2 shows an illustration in the form of a section along a section line A—A in FIG. 1;

FIG. 3 shows a side view of the exemplary embodiment as illustrated in FIGS. 1 and 2, with an electrical conductor connected;

FIG. 4 shows a view from above of the arrangement as illustrated in FIG. 3;

FIG. 5 shows an illustration in the form of a section of a further exemplary embodiment;

FIG. 6 shows the exemplary embodiment as illustrated in FIG. 5, with a conductor connected;

FIG. 7 shows an illustration in the form of a section of a further exemplary embodiment;

FIG. 8 shows a plan view of the exemplary embodiment shown in FIG. 7;

FIG. 9 shows an embodiment of a mount for a contact-making bolt;

FIG. 10 shows a plan view of the arrangement shown in FIG. 9;

FIG. 11 shows an exemplary embodiment in which the embodiment of a mount as illustrated in FIGS. 9 and 10 for a contact-making bolt is connected to a pole sleeve;

FIG. 12 shows a longitudinal section through a further exemplary embodiment; and FIG. 13 shows an enlarged illustration of a detail of the exemplary embodiment shown in FIG. 12.

DETAILED DESCRIPTION OF THE INVENTION

In the exemplary embodiments, as illustrated in the figures, of a connecting pole for an accumulator, a pole sleeve 1 is provided which can be inserted in a gastight and liquidtight manner into a plastic housing part 8, for example a housing cover of an accumulator housing. In order to achieve the necessary sealing, circumferential projections 19 are provided on the base part of the pole sleeve 1 and are designed in the manner known from DE 42 41 393 C2. This results in the pole sleeve being inserted in a sealed manner, effectively preventing electrolyte or gas from emerging from the interior of the accumulator while at the same time ensuring that forces which occur in the axial direction of the pole sleeve do not result in the pole sleeve becoming loosened from its seat.

As can be seen from FIGS. 3 and 5, in the installed state, the pole sleeve 1 is electrically connected to a cell connector 2 by, for example, soldering, welding or in some other way. In this case, the contact-making material, in particular lead, flows in a gap 25 which is formed between the conical cell connector 2 and the inner wall of the pole sleeve 1, and makes electrical contact with the pole sleeve by means of the cell connector. In this case, the space which is surrounded by an overhang 17 or 28 is also filled or filled by casting, as is shown by the crossed shaded area in FIG. 6.

In the exemplary embodiments shown in FIGS. 1 to 6 and 12, 13, a first contact-making element in the form of a contact-making sleeve 5 is firmly connected to the outside of the pole sleeve 1 or to an axial pole sleeve extension 11. The contact-making sleeve 5 is composed of a harder material than the pole sleeve 1. This is an electrically conductive material (metal) which preferably has a higher melting point than that of the material of the pole sleeve 1 which may, in a known manner, be composed of lead. Brass is a suitable material for the contact-making sleeve 5. The contact-making sleeve 5 is preferably electrochemically tinned, so that a connecting layer 22 is formed by techniques such as bonding, soldering or welding between the pole sleeve 1 and the contact-making sleeve 5, for connection to the pole sleeve 1 or to the axial pole sleeve extension 11. This connecting layer 22 ensures a mechanically firm connection between the pole sleeve 1 and the contact-making sleeve 5. The connecting layer 22 is located between the outside of the pole sleeve 1 or of the pole sleeve extension 11 and the inner surface of the contact-making sleeve 5. The connecting layer 22 is produced during the heating of the pole sleeve 1 and of the contact-making sleeve 5 and results from the formation of an alloy on the surface between the lead of the pole sleeve 1 and the tin of the contact-making sleeve 5.

The contact-making sleeve 5 in the exemplary embodiment shown in FIGS. 1 to 4 has an overhang 17 which projects in the axial direction beyond the upper end of the pole sleeve 1 or of the pole sleeve extension 11. This overhang 17 prevents lead which is liquefied during the application of heat for connection of the pole sleeve 1 to the cell connector 2 from dripping or running onto the plastic housing or plastic housing part 8. Liquefied lead is kept back within the overhang 17, in the same way as in a container. In the exemplary embodiment shown in FIGS. 5 and 6, the overhang 28 is integrally formed on the pole sleeve 1.

An external thread 4 is provided on the outside of the contact-making sleeve 5. As can be seen from FIG. 3, the internal thread 7 on a locknut 6 can be screwed as a locking element onto this external thread 4. This results in a mechanical lock against loosening of an electrical connection between an electrical conductor 3 or an electrical cable and the connecting pole. The electrical connection is in this case produced by a contact-making eye 14 which is provided at the end of the electrical conductor 3. In order to make electrical contact, the contact-making eye 14 is pushed over the contact-making sleeve 5, so that the latter projects through an eye opening 16 in the contact-making eye 14. In the illustrated exemplary embodiment, the contact-making eye 14 is integrally formed on a circumferential collar 15 on the contact-making sleeve 5. When the locknut 6 is screwed onto the contact-making sleeve 5, the contact-making eye 14 is pushed onto the circumferential collar 15, thus producing a good electrical contact. In the process, the contact-making sleeve 5 forms a first contact-making element with the external thread 4, and the locknut 6 forms a locking element with the internal thread 7. This ensures a mechanical lock against loosening of the electrical connection, in particular loosening of the contact-making eye 14, which forms a second contact-making element, from the connecting pole. The circumferential collar 15 holds the contact-making eye 14 at a distance from the plastic housing part 8, in particular the housing cover. This can also be achieved by the base of the pole sleeve 1, which is embedded in the plastic housing part 8, projecting beyond the surface of the plastic housing part 8 and by placing the contact-making eye 14 directly onto the pole sleeve 1.

In the exemplary embodiment shown in FIGS. 5 and 6, the circumferential collar 15 has an oblique or conical contact surface 26, onto which a corresponding conical contact surface 27 in the contact-making eye 14 is pushed.

In the exemplary embodiments illustrated in FIGS. 1 to 6, the collar 15 and hence the contact-making sleeve 5 are supported on the base part of the pole sleeve 1 in the axial direction by means of radially protruding projections 18 (FIG. 2).

In the exemplary embodiment shown in FIGS. 5 and 6, the contact-making sleeve 5 is arranged in a depression 29 which runs all the way round the outside of the pole sleeve 1. The depression 29 on the outer circumference of the pole sleeve 1 has an axial extent which corresponds to the axial length of the contact-making sleeve 5. The contact-making sleeve 5 is preferably attached to the outer circumference of the pole sleeve 1 during the process of forming the pole sleeve, for example by means of die casting. For this purpose, the contact-making sleeve 5 is placed in the casting mold in which the pole sleeve 1 is manufactured, and the pole sleeve material, in particular lead, is connected to the contact-making sleeve 5 during the casting of the pole sleeve. This method is particularly advantageous for the exemplary embodiments illustrated in FIGS. 5, 6 and 12, 13. This results in the contact-making sleeve 5 being positioned securely in the axial direction in the circumferential depression 29 on the outer circumference of the pole sleeve 1.

In the axial direction, the pole sleeve 1 has the overhang 28 which, if required, may also have a conical widened area 23. During the connection of the cell connector 2, this cell connector 2 is pushed into the cavity in the pole sleeve 1, as is shown in FIG. 6. The space which is surrounded by the overhang 28 above the cell connector 2 as well as the gap 25 between the conical outer circumference of the cell connector 2 and the inner circumference of the poll sleeve 1 are filled with a contact-making material 30, in particular lead, as is shown in FIG. 6.

In the exemplary embodiments which are shown in FIGS. 1 to 6 and 12, 13, the contact-making sleeve 5 extends coaxially with respect to the pole sleeve axis 13. In the exemplary embodiments which are illustrated in FIGS. 7 to 11, a contact-making bolt 9 is attached to the pole sleeve 1 at the side, offset with respect to the pole sleeve axis 13. The contact-making bolt 9 extends parallel to the pole sleeve axis 13. A different angular orientation between the contact-making bolt 9 and the pole sleeve axis 13 may be chosen if this is necessary for installation.

In the exemplary embodiments which are shown in FIGS. 7 to 11, the contact-making bolt 9 is provided as the first contact-making element instead of the contact-making sleeve 5. The contact-making bolt 9 is arranged at the side of the pole sleeve 1. The mount 12 in which the contact-making bolt 9 is anchored may, as in the exemplary embodiment which is shown in FIGS. 7 and 8, be integrally formed on the pole sleeve 1 and may project from it at right angles. The cell connector 2, which is not shown in more detail, extends as is shown in FIG. 3 through the cavity in the pole sleeve 1 and may be welded or soldered to it. On the upper face, the pole sleeve 1 has a conical widened area 23 which is used as a space to hold material which is liquefied during the welding or soldering of the cell connector 2 to the pole sleeve 1.

In the exemplary embodiment which is illustrated in FIGS. 9 to 11, the mount 12 is likewise connected to the pole sleeve 1 by welding or soldering, possibly at the same time as the welding or soldering of the cell connector, which is not shown in any more detail, to the pole sleeve 1. For this purpose, the ring part 24 of the mount 12 is placed on the upper face of the pole sleeve 1. The ring part 24 projects beyond the upper edge of the pole sleeve 1, as can be seen in FIG. 11. This likewise creates a holding container for material which is liquefied during the connection of the cell connector to the pole sleeve.

In the exemplary embodiments which are shown in FIGS. 7 to 11, the contact-making bolt 9 has the external thread 4, to which the thread 7 of a locknut 10 is screwed, with the locknut 10 forming the locking element. The conductor 3 which is to be connected to the connecting pole may, as is shown in FIGS. 3, 4 and 6, for this purpose be pushed over the contact-making bolt 9 or may be pushed onto a circumferential collar of the contact-making bolt 9, which is composed of conductive material, during the tightening of the locknut 10. However, it is also possible for the contact-making eye 14 to be pushed onto the mount 12, which is likewise composed of an electrically conductive material.

If required, in the exemplary embodiments described above, the locknut 6 or 10 may be surrounded by an insulating sheath.

A bolt foot 21 has circumferential anchoring projections 20 in order to anchor the contact-making bolt 9 in the mount 12. For this purpose, the bolt foot 21 is firmly embedded in the mount material.

In the exemplary embodiment which is illustrated in FIGS. 12 and 13, the contact-making sleeve 5 is located on the outer surface of the pole sleeve extension 11. The contact-making sleeve 5 is likewise composed of a harder material, in particular brass, than the pole sleeve material, which is conventionally composed of lead. The contact-making sleeve 5 is arranged in an interlocking manner in the circumferential recess or depression 29 on the outside of the pole sleeve extension 11. The contact-making sleeve 5 is preferably tinned, so that a connection formed by techniques such as bonding, soldering or welding 22 is produced by a solder joint, by means of the tin layer, between the pole sleeve material and the material of the contact-making sleeve 5 when heated.

The contact-making sleeve 5 can likewise be firmly connected to the pole sleeve extension 11 during the process of forming the pole sleeve 1 and the pole sleeve extension 11 which is integrally part of it. To do this, the contact-making sleeve 5 can be inserted into the molding die, for example into the casting die, in which the pole sleeve 1 is molded, and the molten lead is then introduced into the molding die in order to form the pole sleeve 1. The contact-making sleeve 5 is preferably composed of a material with a higher melting point than that of the pole sleeve material. During the process of forming the pole sleeve 1, the pole sleeve material, which can flow, surrounds the solid contact-making sleeve 5 so that, as already explained, the latter is firmly cast in the recess 29 in the region of the pole sleeve extension. At the same time, the connection by techniques such as bonding, soldering or welding 22 which is formed by the tin layer is also produced between the pole sleeve 1 and the contact-making sleeve 5.

As can be seen in particular from FIG. 13, circumferential grooves 32 are formed on the outer surface of the contact-making sleeve 5. The grooves 32 are in the form of circular rings and are arranged concentrically around the pole sleeve axis 13. These grooves 32 allow an interlock and/or force fit to be produced with the contact-making element 31, which is in the form of a contact-making eye 14 and is illustrated schematically in FIG. 12. The eye opening in this contact-making element 31 can be placed in a known manner onto the contact-making sleeve 5, with a clamping seat between the outside of the contact-making sleeve 5, which is provided with the grooves 32, and the inside of the annular contact-making element 31 being produced, for example, by means of a clamping screw or some other clamping element. The contact-making element 31 is conductively connected to the conductor 3, as is shown in FIGS. 3 to 6.

The invention claimed is:

1. A connecting pole for an accumulator, the connecting pole being electrically connected to a cell connector and an electrical conductor, the connecting pole comprising:
   a pole sleeve, the pole sleeve adapted to be inserted in a sealed manner into a plastic housing part of a housing of the accumulator, the pole sleeve electrically contacts the cell connector;
   a first contact-making element being firmly connected to the circumference of the pole sleeve, by a connecting layer formed by one of the processes selected from the group consisting of bonding, soldering, and welding, the connecting layer being located between an inner surface of the first contact-making element and an outer surface of the pole sleeve, the first contact-making element being composed of a mechanically harder material than the material of the pole sleeve;

the pole sleeve comprising an axial pole sleeve extension, and wherein the first contact-making element is in the form of a contact-making sleeve which is attached to the outside of the pole sleeve or to the axial pole sleeve extension; and a second contact-making element which is conductively connected to the electrical conductor, the first contact-making sleeve making electrical contact on an outer surface with the second contact-making element.

2. The connecting pole as claimed in claim 1, wherein the outer surface of the first contact-making sleeve is designed such that the second contact-making element can make electrical contact with the first contact-making sleeve by means of a force fit or an interlock.

3. The connecting pole as claimed in claim 1, wherein circumferential grooves, provided on the outside of the first contact-making sleeve, are arranged coaxially with respect to the pole sleeve.

4. The connecting pole as claimed in claim 1, wherein an external thread is provided on the first contact-making sleeve.

5. The connecting pole as claimed in claim 1, wherein the first contact-making sleeve is composed of a material with a higher melting point than a melting point of the material of the pole sleeve.

6. The connecting pole as claimed in claim 1, wherein a connection by a soldered joint is provided between the pole sleeve and the first contact-making sleeve.

7. The connecting pole as claimed in claim 1, wherein the first contact-making sleeve is composed of brass.

8. The connecting pole as claimed in claim 1, wherein the first contact-making sleeve is firmly connected to the pole sleeve during the process of forming said pole sleeve.

9. The connecting pole as claimed in claim 1, wherein the first contact-making sleeve is arranged coaxially with respect to the pole sleeve.

* * * * *